United States Patent [19]

Maloney et al.

[11] Patent Number: 4,605,773
[45] Date of Patent: Aug. 12, 1986

[54] LOW-FOAMING, PH SENSITIVE, ALKYLAMINE POLYETHER SURFACE ACTIVE AGENTS AND METHODS FOR USING

[75] Inventors: James E. Maloney, Eagan; James A. McDonell, St. Paul, both of Minn.

[73] Assignee: Diamond Shamrock Chemicals Company, Dallas, Tex.

[21] Appl. No.: 608,775

[22] Filed: May 10, 1984

Related U.S. Application Data

[62] Division of Ser. No. 406,885, Aug. 10, 1982.

[51] Int. Cl.$^4$ ............................................. C07C 93/04
[52] U.S. Cl. ..................................... 564/505; 564/475; 564/347
[58] Field of Search ................ 564/505, 475, 347; 252/357, DIG. 2

[56] References Cited

U.S. PATENT DOCUMENTS

| | | | |
|---|---|---|---|
| 2,673,882 | 3/1954 | Griffin | 260/615 |
| 2,674,619 | 4/1954 | Lundsted | 260/435 |
| 2,871,266 | 1/1959 | Riley | 260/584 |
| 3,036,130 | 5/1962 | Jackson et al. | 564/505 |
| 3,117,999 | 1/1964 | Boettner et al. | 260/584 |
| 3,118,000 | 1/1964 | Dupre et al. | 260/584 |
| 4,112,231 | 9/1978 | Weibull et al. | 544/174 |
| 4,301,083 | 11/1981 | Yoshimura et al. | 564/505 |

FOREIGN PATENT DOCUMENTS

| | | | |
|---|---|---|---|
| 538842 | 3/1957 | Canada. | |
| 538843 | 3/1957 | Canada. | |
| 754679 | 8/1956 | United Kingdom | 260/584 |
| 1453261 | 3/1975 | United Kingdom. | |
| 1566770 | 12/1977 | United Kingdom | 564/505 |

*Primary Examiner*—Charles F. Warren
*Assistant Examiner*—John A. Sopp

[57] ABSTRACT

Alkylamine polyether surface active agent compositions and methods for using are described. The instant compositions are low foaming, and pH sensitive and are generally of the structure:

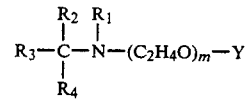

in which
(a) $R_1$ may be hydrogen or alkyl;
  if $R_1$ is hydrogen then $R_2$, $R_3$ and $R_4$ must be alkyl having a total number of carbon atoms falling in the range of 7 to 23;
  if $R_1$ is alkyl, then $R_2$, $R_3$ and $R_4$ may be alkyl or hydrogen, the total number of carbon atoms in $R_1+R_2+R_3+R_4$ falling in the range of 7 to 36 (preferably about 10 to 20);
(b) The $-(C_2H_4O)_m-$ segment must be a poly(oxyethylene) homogeneous chain or "block" polymer (i.e., a homopolymer), m having an average value in the range of 1 to 15, preferably 5 to 13; and
(c) Y is selected from the group consisting of:
  (1) homogeneous poly(oxypropylene) chain (PO) "block" polymer or residue (i.e., a homopolymer), of the structure—$(C_3H_6O)_nH$, having a value in the range of 1 to 50, preferably 6 to 30;
  (2) hydrophobic end cap (e.g., $-CH_2-0$); and
  (3) hydrophobic end capped polyoxypropylene residue.

A particularly preferred class of surfactants of the instant invention constitutes 1,1,1-trialkylmethylamine ethyleneoxy(EO)-propyleneoxy(PO) polyethers having from 1 to 15 moles of ethyleneoxide residue and from 1 to 50 moles of propyleneoxide per mole of alkylmethylamine.

The methods of the instant invention generally relate to the production of paper from secondary fiber. Unexpectedly, the compositions of the instant invention are found to be applicable in the common methods employed very pH sensitive, size-safe and to produce paper products from secondary fiber.

5 Claims, No Drawings

LOW-FOAMING, PH SENSITIVE, ALKYLAMINE POLYETHER SURFACE ACTIVE AGENTS AND METHODS FOR USING

This is a division of application Ser. No. 06/406,885, filed Aug. 10, 1982.

This invention relates to a new composition of matter and methods for using said composition. The new compositions are a specific alkylamine polyoxyalkylene or polyether surface active agents (surfactants) comprising: (a) a hydrophobic moiety comprising one or more aliphatic groups which is connected to (b) a secondary or tertiary amine segment which is in turn connected to (c) a single polyether segment comprising poly(ethylene-oxy) (EO) and poly(propylene-oxy) (PO) or hydrophobic end caps e.g., benzyl adduct. The methods of the present invention relate primarily to the manufacture of paper from secondary fiber. Of critical importance to achieve the important composition and method advantages of the present invention is the number of moles of EO and PO and the presence of an end cap, if employed.

PRIOR ART

U.S. Pat. Nos. 3,117,999 and 3,118,000, both assigned to Rohm and Haas Company, disclose compositions which are related to the compositions of the present invention. The U.S. Pat. No. 3,117,999 discloses compounds of the formula:

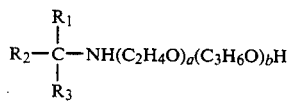

Formula I in which $R_1$, $R_2$ and $R_3$ are alkyl groups whose total carbon content ranges from 7 to 23, a is an integer of from 15 to 45, b is a number of from 15 to 67.5, and the relation of b:a is 1:1 to 1.5:1; or

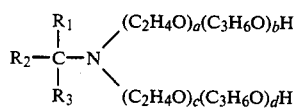

Formula II in which $R_1$, $R_2$ and $R_3$ are the same as before, a+c equals an integer of from 15 to 45, b+d equals a number of from 15 to 67.5, and the relation of (b+d):(a+c) is 1:1 to 1.5:1

U.S. Pat. No. 3,118,000 discloses compounds of the formulae:

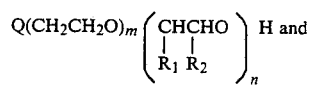

Formula III

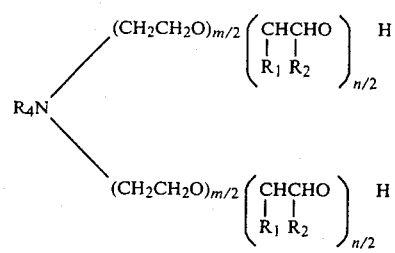

Formula IV in which $Q = R_3O$ or $R_4NH$;
$R_1$ and $R_2 = CH_3$ or H;
with $R_1 = CH_3$ when $R_2 = H$ and $R_2 = CH_3$ when $R_1 = H$;
$R_3$ consists of an alkylated phenyl containing a total of 4 to 18 carbon atoms in the alkyl group or a straight or branched chain alkyl group having 8 to 18 carbon atoms;
$R_4$ is a straight chain alkyl group with 8 to 18 carbon atoms.

Nonionic surfactants which are capable of being protonated or deprotonated depending upon the hydronium ion ($H^+$) concentration of their environment (i.e., their pH) are described in Rohm and Haas Company Speciality Chemicals TRITON R-W Surfactants pamphlet CS-450, dated September, 1978. This pamphlet describes the protonation of nonionic surfactants containing amine functionality according to Equation I.

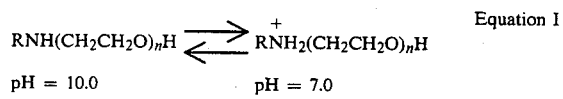

Equation I pH = 10.0    pH = 7.0

As noted in the CS-450 pamphlet, the TRITON R-W series are polyethoxyalkylamines wherein n in Equation I has a value of 1, 2, 3, 5, 7.5, 10, 12.5, and 15, there being no further specificity of the structure "R".

Finally, Rohm and Haas Company's publication SP-127 titled, "Priminox Polyethoxy Amines" dated 12/59 describes polyethylene oxide derivatives of 1,1,1-trialkylmethyl amines (hereafter sometimes referred to as "TAMA"). "Priminox R" series are described as the reaction products of "Primene 81-R" (a 12–14 carbon TAMA) with ethylene oxide. "Priminox T" series are described as the reaction product of Primene JM-T (an 18–22 carbon TAMA) with ethylene oxide. This pamphlet does not disclose nor suggest that "Priminox R" or "T" series may be polypropoxylated, nor the advantages thereby obtained.

THE PRESENT INVENTION

The present invention provides unexpected pH sensitivity resulting in size enhancement, carefully controllable foaming tendency (described below), recyclability and numerous other advantages in various methods of paper manufacture, especially those which employ secondary fiber sources (i.e., non-virgin or recycled fiber). These advantages are achieved by means of nonionic surfactants of the structure:

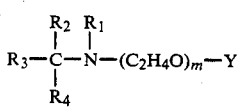

Formula V in which
(a) $R_1$ may be hydrogen or alkyl;
   if $R_1$ is hydrogen then $R_2$, $R_3$ and $R_4$ must be alkyl having a total number of carbon atoms falling in the range of 7 to 23;
   if $R_1$ is alkyl, then $R_2$, $R_3$ or $R_4$ may be alkyl or hydrogen, the total number of carbon atoms in $R_1+R_2+R_3+R_4$ falling in the range of 7 to 36 (preferably about 10 to 20);
(b) The $-(C_2H_4O)_m-$ segment must be a poly(oxyethylene) homogeneous chain or "block" polymer (i.e., a homopolymer), m having an average value in the range of 1 to 15, preferably 5 to 13; and
(c) Y is selected from the group consisting of:
   (1) homogeneous poly(oxypropylene) chain (PO) or "block" polymer or residue (i.e., a homopolymer), of the structure $-(C_3H_6O)_nH$, "n" having a value in the range of 1 to 50, preferably 6 to 30;
   (2) hydrophobic end cap (e.g., $-CH_2-\phi$; and
   (3) hydrophobic end capped polyoxypropylene residue.

The instant novel compounds provide enhanced foam control at desired operating temperatures. In the preferred EO-PO polyethers (which have a polyether chain molecular weight in the range of 100 to 4,000, preferably about 700 to 2,500), foam control is accomplished by selecting the length of the EO and PO blocks and PO/EO ratio according to foam break temperatures (described below), while limiting total EO and PO to maintain the hydronium ion sensitivity. It has been found that the hydronium ion sensitivity is slight to nil when the EO's and PO's exceed 15 and 50 respectively whether of block or heteric design. It has also been found that the temperature/foam control specificity is dependent on block alkoxylation and essentially unattainable with heteric polyethers.

DETAILED DESCRIPTION OF THE INVENTION

Compositions

Synthesis of the novel surfactants of Formula V is normally a two step process starting with the reaction of an alkylamine having the general structural formula:

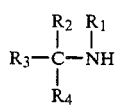  Formula VI wherein $R_1 R_2$, $R_3$ and $R_4$ have the values stated above) and from about 1 to 15 moles (preferably from about 7 to about 13 moles) of ethylene oxide (EO). This reaction (which, as described, is accomplished in two steps) produces an intermediate which is then subsequently propoxylated or end capped (or both). Formula VI embraces at least two classes of alkylamines depending upon whether $R_1$ is hydrogen or alkyl. In the case where $R_1$ is alkyl, $R_2$, $R_3$ and $R_4$ may be independently hydrogen or alkyl having in total (with $R_1$) about 7 to 36 carbon atoms (preferably about 10 to 20 carbon atoms). $R_1$ being alkyl is intended to include intermediate alkylamine polyethers of the structure

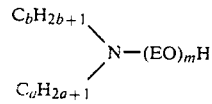

(a and b are integers which may be the same or different)
which would then be reacted with propylene oxide or with e.g., benzyl chloride (or both), to complete the composition. Alkylamine polyethers of this structure have been found to possess high pH sensitivity as defined herein.

In the instance where $R_1$ is hydrogen it is necessary that $R_2$, $R_3$ and $R_4$ each be alkyl having in total about 7 to 23 carbon atoms. In this preferred class of alkyl amines, it will be recognized that the amine linkage is secondary, linking the polyether segment and a 1,1,1-trialkylmethyl hydrocarbon segment. Thus, the preferred polyethers herein are of the structure

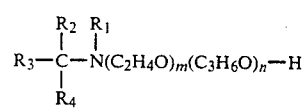

in which
(a) $R_1$ must be hydrogen;
(b) $R_2$, $R_3$ and $R_4$ must be at least methyl groups, the total carbon atoms of $R_2+R_3+R_4$ falling in the range of 7 to 23;
(c) the $-(C_2H_4O)_m-$ segment must be a poly(oxyethylene) homogeneous chain block polymer, m having an average value in range of 1 to 15; and
(d) the $-(C_3H_6O)_n-$ segment must be a homogeneous poly(oxypropylene) chain block polymer, n having a value in the range of 1 to 50.

In the two classes of alkyl amines discussed above, amine functionality is tertiary in the former and secondary in the later. By the definitions of $R_1$, $R_2$, $R_3$ and $R_4$ specified herein alkyl amine polyethers of the structure

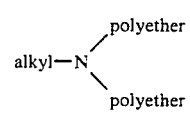

are excluded.

This exclusion is intended because such materials surprisingly do not exhibit pH sensitivity. This is evident from Table 1 where commercial amine ethoxylates of the type excluded above are compared via their "pH-sensitivity" (measured here as surface tension sensitivity) to dialkylamine alkoxylates and 1,1,1-trialkylmethyl primary amine alkoxylates. It will be seen from Table 1 that non-propoxylated materials do exhibit a small level of Ph sensitivity (materials 2 and 3 from the top). However, the propoxylation of these materials would reduce their pH sensitivity to essentially zero (compare materials 4 and 5 and 6 and 7).

TABLE 1

Change in Surface Tension between pH = 12 and pH = 2 for various amine polyethers (0.1% w/w, T = 20° C.)

| COMPOUND | SURFACE TENSION (dynes/cm²) AT pH | | | | | |
|---|---|---|---|---|---|---|
| | 12 | 10 | 8 | 6 | 4 | 2 |
| M-310 (Texaco) | 38.9 | 38.9 | 37.4 | 37.3 | 37.5 | 35.5 |

$$C_{10-12}OCH_2CHOCH_2CH-N\begin{matrix}(CH_2CH_2O)_5H\\ \\(CH_2CH_2O)_5H\end{matrix}$$
$$\begin{matrix}|\quad\quad|\\CH_3\quad CH_3\end{matrix}$$

| | | | | | | |
|---|---|---|---|---|---|---|
| Ethoduomeen T/20 (Armak) | 41.2 | 39.7 | 41.2 | 42.5 | 46.0 | 45.2 |

$$\text{Tallow-N}\begin{matrix}(CH_2)_3N\begin{matrix}(CH_2CH_2O)_xH\\(CH_2CH_2O)_xH\end{matrix}\\(CH_2CH_2O)_xH\end{matrix}$$

$3x = 10$

| | | | | | | |
|---|---|---|---|---|---|---|
| Ethomeen S/20 (Armak) | 39.4 | 39.0 | 38.8 | 41.0 | 45.8 | 46.4 |

$$\text{Soya-N}\begin{matrix}(CH_2CH_2O)_5H\\(CH_2CH_2O)_5H\end{matrix}$$

| | | | | | | |
|---|---|---|---|---|---|---|
| di-n-hexylamine decaethoxylate | 28.0 | 31.0 | 49.0 | 54.0 | 54.8 | 54.0 |

$$\begin{matrix}CH_3(CH_2)_4CH_2\\ \\CH_3(CH_2)_4CH_2\end{matrix}N(CH_2CH_2O)_{10}H$$

| | | | | | | |
|---|---|---|---|---|---|---|
| di-n-hexylaminedecaethoxylate pentapropoxylate | 30.2 | 32.4 | 42.0 | 42.0 | 42.0 | 42.8 |

$$\begin{matrix}CH_3(CH_2)_4CH_2\\ \\CH_3(CH_2)_4CH_2\end{matrix}N(CH_2CH_2O)_{10}(CH_2\overset{CH_3}{\underset{|}{C}}HO)_5H$$

| | | | | | | |
|---|---|---|---|---|---|---|
| Primene 81R-decaethoxylate | 31.0 | 32.0 | 48.5 | 49.5 | 52.0 | 52.5 |

$$R_2-\underset{R_1}{\overset{R_3}{\underset{|}{\overset{|}{C}}}}-\overset{H}{N}(CH_2CH_2O)_{10}H$$

| | | | | | | |
|---|---|---|---|---|---|---|
| Primene 81R-decaethoxylate hexapropoxylate | 31.4 | 33.7 | 41.6 | 45.0 | 47.0 | 45.1 |

$$R_2-\underset{R_1}{\overset{R_3}{\underset{|}{\overset{|}{C}}}}-\overset{H}{N}(CH_2CH_2O)_{10}(CH_2\overset{CH_3}{\underset{|}{C}}HO)_6H$$

In any event, whether the amine linkage is secondary or tertiary the alkyl group or groups to which the nitrogen atom is bonded provide the hydrophobic portion of the surfactants herein disclosed. It is for this reason that "hydrocarbon" means consisting primarily of hydrogen and carbon so as to be hydrophobic. It is critically important to achieve the advantages of the present invention that the hydrocarbon group or groups of the instant surfactants be hydrophobic. One skilled in the art will recognize that this constraint must be met in order for the overall molecule to exhibit surfactant properties such as surface tension reduction, interfacial tension, wetting, penetration, emulsification, foaming and detergency when synthesis is completed. The preferred 1,1,1 trialkylmethylamine starting materials are commercially available from the Rohm & Haas Company under the trade designation "Primene". Ethoxylated "Primene" surfactants also are available from Rohm and Haas Company as described in "TRITON" RW-Surfactants, Rohm & Haas Company technical publication FCS-450 dated September, 1978. The "TRITON" RW series are polyethoxyalkylamines made by the reaction of TAMA with ethylene oxide. According to titration and spectroscopic analysis, the "TRITON" RW surfactants appear to have a highly branched 1,1,1-trialkylmethylamine structure, $R_1+R_2+R_3$ having a total of 12 to 14 carbon atoms.

In the alternative, the preparation of the preferred polyalkoxylated 1,1,1-trialkylmethylamines is described in the U.S. Pat. No. 2,871,266, issued Jan. 27, 1959 to Rohm & Haas Company. The '266 patent teaches a two-step method for preparing polyoxyalkylated derivatives of 1,1,1-trialkylmethylamines, there being from 5 to 100 moles of ethylene oxide, propylene oxide (or both) added to the 1,1,1-trialkylmethylamines as is more fully discussed below. The compositions of the '266 patent differ from the compositions of the present invention in that no mention is made nor is there any recognition of the advantages of block poly(ethyleneoxy)-poly(propyleneoxy) derivatives of the 1,1,1-trialkylmethylamines.

As is noted above, hydrophobic segment or segments of the present molecule are connected by means of a nitrogen linkage to a polyether moiety in what is ultimately a secondary or tertiary amine. Whether the amine is secondary or tertiary, it is critically important that the amine nitrogen have but single oxyalkylation. Alkyl amines with more than one polyether chain are simply not pH sensitive.

According to U.S. Pat. No. 2,871,266, reaction of the preferred TAMA with the ethylene oxide is most conveniently accomplished by mixing an acid catalyst with TAMA alone or with an organic solvent such as naptha, benzene or toluene. The temperature employed in the reaction may be between 20° C. and 180° C., preferably 60° C. and 95° C., particularly when a hydrochloric acid catalyst is used. Ethylene oxide is then passed into the TAMA-catalyst mixture. The use of above atmospheric pressure is optional. It is described in the literature that the addition of the first mole of ethylene oxide occurs fairly easily, particularily when the $C_8$ or $C_9$ amines are employed. Subsequent moles of ethylene oxide are added less easily than the initial mole, particularly as the size of the hydrocarbon moiety increases until at about $C_{14}$ to $C_{16}$ only a single mole of ethylene oxide can be added under any conditions which employ an acid catalyst.

As described in U.S. Pat. No. 2,871,266, subsequent moles of ethylene oxide are most easily added to the monoethoxylated TAMA when, after addition of the first mole of ethylene oxide, the acid catalyst is neutralized (e.g. with a base such as sodium hydroxide, sodium carbonate, potassium hydroxide, etc.) and an alkaline catalyst such as an alkaline metal hydroxide (including sodium or potassium hydroxides) is employed. Alkali metal alcoholates such as sodium methoxide, potassium ethoxide or sodium butoxide also may be desirable alkaline catalysts. The reaction to add subsequent moles of ethylene oxide may be performed at ordinary pressures or elevated pressures (usually a pressure from about 10 to 20 p.s.i. [60 to 120 kPa]) provides a rapid rate of reaction at temperatures between 100° C. to 200° C. The preferred reaction temperature range is 130° C. to 170° C.

In order to synthesize the surfactants of the present invention it is necessary to condense on the amine group a single block polyether chain having from 1 to 15 moles of ethylene oxide (preferably 7-13 moles). It is critically important that the ethylene oxide chain be homogeneous. Stated otherwise, the present invention contemplates that the ethylene oxide polyether segment will be a homopoloymer or "block" polymer. Addition of mixtures of ethylene oxide or propylene oxide (or other epoxides) or the condensation of other than ethylene oxide with the previously described alkylamines are outside the scope of the present invention. It is only when this critically important requirement is observed that the advantages of the present invention are achieved.

To complete the synthesis of the composition of the present invention, it is necessary to add to the end of the polyethylene oxide chain a more hydrophobic, less polar second polyether chain having either 1 to 50 moles of propylene oxide, (preferably 6 to 30 moles), hydrophobic end cap, or a mixture with a plurality of moles of propylene oxide between polyEO and the end cap. In other words, the present invention contemplates in its preferred aspect the addition of a "block" or homopolymer chain of polypropylene oxide on the hydroxy end portion of the polyethylene oxide intermediate previously condensed with the alkylamine.

After the two-step addition of ethylene oxide to the alkylamine, addition of propylene oxide proceeds in a single step. Propylene oxide reacts relatively smoothly with the hydroxy-terminated ethylene oxide chain to produce compositions of this invention. The propylene oxide block polyether chain is best added using basic catalysts such as sodium hydroxide, sodium carbonate, potassium hydroxide, potassium carbonate, or calcium hydroxide. Thus, from one to fifty moles of propylene oxide (preferably 6–30 moles), are added to the alkylamine ethylene oxide intermediate.

In a less preferred aspect of the present invention, it is possible to replace a portion or the entirety of the polypropylene oxide chain or block with an end cap e.g., a benzyl group. Other end caps which could be employed herein include methyl, ethyl, propyl, isopropyl or t-butyl. Thus, for example, if benzyl termination is desired, benzyl chloride could be condensed with the hydroxy-terminated polyethylene oxide alkylamine intermediate. Benzyl termination has been found to be approximately the equivalent (in terms of foam control) of 8 moles of propylene oxide, particularly within the methods contemplated in the present invention. Since it is possible to control the addition of polypropylene oxide to the polyethylene oxide intermediate (to add from 2 to 6 moles), benzyl termination is not preferred because it does not provide the same ability to control foam and temperature performance.

It is within the definition of the present surfactants that a benzyl-terminated polypropylene oxide segment could be employed in place of a just benzyl termination or just polypropylene oxide. Since benzyl termination is roughly the performance equivalent of about 8 moles of propylene oxide, substitution therewith is definitely contemplated. This means the ranges of propylene oxide would be from 1 to 42, preferably 6 to 22 if benzyl termination of the polypropylene oxide chain is desired. Similarly, other end caps can be utilized with suitable reduction in the number of moles of propylene oxide.

Several other synthetic methods have been or can be employed to condense the amine and ethylene oxide. One method for accomplishing such condensation is described in U.S. Pat. No. 4,112,231, assigned to Berol Kemi AB issued on Sept. 5, 1978. In particular, the '231 patent describes a method for condensation of epoxides with organic compounds having active hydrogens such as alcohols, polyols, and amines employing a neutral inorganic salt selected from the group consisting of sodium fluroborate, magnesium perchlorate, calcium perchlorate, manganese perchlorate, nickel perchlorate and zinc perchlorate. The '231 patent describes the preferred catalyst as zinc perchlorate. The reaction conditions of the U.S. Pat. No. 4,112,231 Patent are within the range of 80° C. to about 200° C. and preferably within the range of 100° C. to 150° C. The reaction temperature in all cases is below the decomposition temperature of the reactants thus increasing the yield. Utilization of an inert organic solvent and optionally employing pressurized reaction vessels also is described. U.S. Pat. No. 3,117,999 describes the catalyst system of alcohol and water, the reaction condition being 80° C. and a pressure of 20 to 30 pounds per square inch (120 to 150 kPa).

The compositions of the present invention are highly "pH sensitive". As the terms employed herein pH sensitivity means that by mere adjustment of the acidity or basicity of the aqueous environment in which the present compositions are employed, it is possible to control the extent to which these compositions behave as surface active agents. Put succinctly, at pH's above approximately 8, the present compositions are nonionic surfactants which exhibit all the advantageous detergency, defoaming, surface tension reduction, etc. properties common to such nonionic surfactants. As the pH of the aqueous environment in which they are dispersed is reduced below 8 (i.e. the instant surfactants begin to encounter a medium of greater acidity), the amine functionality becomes protonated (see Equation I), thereby creating a cationic surface active agent. (This shift in properties occurs at around pH=7-9, depending upon which catalyst or which amine is employed.) The resulting cationic surface active agents do not exhibit the advantageous properties of nonionic surfactants, i.e., they do not stabilize otherwise immiscible suspensions such as oil in water. These cationics tend to be hydrophilic in their properties and thus tend to collect in aqueous media. In practical terms, this means that if an oil and water emulsion (e.g., printer's ink in water) is stabilized by means of the surfactants of the present invention at high pH, reduction of the pH (i.e. by the addition of acid) will break the emulsion and the oil and water separate into layers. As a further example a $C_{12}$-$C_{14}$ trialkylmethylamine-$(EO)_{10}$—$(PO)_{12}$ has a foam break temperature (defined below) and a cloud point of around 65° F. (18° C.). In an alkaline solution at 100° F. (37° C.) it is not soluble but in a dispersed cloudy state (over its cloud point). Yet, when acidified, the solution clears indicating the quaternized analogue is more water soluble. Other measurable phenomena which change as the pH of the present surfactants is dropped include loss of detergency, and increase in surface tension.

Sensitivity to pH is alluded to in some of the technical literature published by the Rohm & Haas Company. However, these discussions were with reference to block ethylene oxide, 1,1,1-trialkylmethylamine derivatives only, and not with surfactants having both ethylene oxide and propylene oxide blocks (or equivalents) contemplated by the present invention.

More particularly, U.S. Pat. No. 3,117,999 and U.S. Pat. No. 3,118,000 (both assigned to Rohm & Haas Company), employ EO in the range of 15 to 45 and PO in the range of 15 1 to 67.7, the ratio of n over m being in the range of 1:1–1.5:1. These materials exhibit little or no pH sensitivity, nor the low foaming characteristics of the materials of the instant invention because the polyether segments are too large. This is demonstrated in the "change" column of Table 2 where the surface tension difference approaches zero as moles of EO and PO increase. This demonstrates the adverse effect of increasing molecular weight on pH sensitivity.

TABLE 2

Change in Surface Tension between pH = 12 and pH = 2 for 1,1,1-trialkyl methyl amine polyethers of the structure:

$$R'-NH-EO_m-PO_nH*$$

| m | n | Foam Break °F. (°C.) | Surface Tension dynes/cm$^2$ | | |
|---|---|---|---|---|---|
| | | | pH 12.0 | pH 2 | Change |
| 7.5 | 0 | 136 (58) | 32.5 | 47.5 | 15.0 |
| 7.5 | 6 | 77 (25) | 34.3 | 44.6 | 10.3 |
| 7.5 | 9 | 67 (19) | 35.3 | 43.0 | 7.7 |
| 7.5 | 12 | 56 (13) | 35.9 | 42.0 | 6.1 |
| 7.5 | 18 | 50 (10) | 37.0 | 40.4 | 3.4 |
| 10.0 | 0 | 165 (74) | 33.0 | 49.6 | 16.6 |
| 10.0 | 6 | 97 (36) | 34.5 | 47.0 | 12.5 |
| 10.0 | 12 | 68 (20) | 35.4 | 44.8 | 9.4 |
| 10.0 | 18 | 58 (14) | 36.1 | 37.0 | 0.9 |
| 10.0 | 24 | 48 (9) | 36.6 | 36.6 | 0 |
| 12.5 | 0 | 182 (83) | 34.7 | 48.5 | 13.8 |
| 12.5 | 12 | 82 (28) | 35.9 | 45.1 | 9.2 |
| 12.5 | 24 | 55 (13) | 36.3 | 39.8 | 3.5 |
| 12.5 | 36 | 48 (9) | 36.8 | 37.2 | 0.4 |

*R' above is $C_{12-14}$ tertiary alkylmethyl, surface tension measurements being taken at 0.1% concentration and 20° C.

From Table 2 it can be seen that increasing the amounts of ethylene oxide and propylene oxide in virtually all cases tended to reduce the pH sensitivity of the composition (i.e., "change" becomes smaller). Thus, the unexpected sensitivity of the present compositions over those of the Rohm and Haas patents (which would have polyether chain molecular weights greater than any of the materials in the table) is seen.

The extreme pH sensitivity of the present lower molecular weight surfactants might be attributed to the fact that the charge on the nitrogen atom resulting from protonation is less dispersed in other polyether material than it would be in the higher molecular weight materials of the Rohm & Haas patents. There simply is no recognition of this phenomena in these materials.

"Foam break temperatures" are measured by adding approximately 0.1% by weight of the nonionic surfactant to be tested by 3 liters of cold water contained in a temperature-controllable, metal 3 liter beaker. Upwardly projecting from the rim of the metal beaker a distance of about 1 foot (30 cm) so as to contain foam generated from the water in the metal beaker is a glass cylinder having a vertical ruler for measuring the height of a column of foam generated therein. Disposed near the open end of the glass cylinder and directed into the metal beaker is a number 30/15 "V-Jet" spray nozzle which is in communication with a pressure controllable water pump. The water pump circulates the contents of the beaker through the nozzle. For purposes of the evaluation herein, a pressure of 10 psi (70 kPa) was provided by the pump to the nozzle. A short period of time after activation of the pump, an equilibrium foam height is produced in the glass cylinder, this equilibrium foam height being characteristic of a given surfactant at a given temperature of the surfactant-water solution. At this point, the temperature of the water in the beaker is gradually increased, the height of the foam column being recorded at approximately 5° F. intervals. The temperature at which the height of the foam column falls to a height of 3 inches (7.5 cm) above the surface of the water in the metal beaker is defined to be the foam break temperature for the material being tested. This definition of "foam break temperature" has been found to correlate well with the foam restriction ability of the material in actual paper making processes.

METHODS

The methods to which the instant compositions are particularly well suited (although not limited thereto) are broadly in the area of the preparation of paper and paper products from secondary fiber. "Secondary fiber", as the term is used herein means cellulosic fiber which has already been converted into paper products at least once. Thus, secondary fiber includes reclaimed fiber which is paper mill processing waste and recycled fiber which is fiber which has been at least once completely converted to an intended end use and which has been returned (i.e. "recycled") for reuse. Another potential application of the present method is in the area of size enhancement of virgin fiber generated from raw fiber sources such as wood.

In the preparation of paper products from secondary fiber, there are generally recognized two distinct processes, viz., deinking and repulping. Both processes require an initial step where the secondary fiber is reduced to a fiber slurry in water. This initial step herein is called defibering or pulping so as not to confuse it with a multiple-step "repulping" process. In the process of deinking, secondary fiber is decontaminated, meaning that substantially all secondary cellulose fiber is separated from substantially all non-cellulose materials or contaminants to produce decontaminated secondary fiber which can be employed to make white or essentially white paper. The non-cellulosic contaminants in any deinking process are generally coatings, inks, "sizes" (meaning materials which tend to enhance the water resistivity or ink receptivity of the paper product), and other contaminants such as staples, dirt, etc.

"Repulping" processes, on the other hand, are not intended to produce a paper end-product in which the secondary cellulose fiber and non-cellulose constituents are separated other than such as may accidentally or unintentionally occur during paper forming operations. Repulping simply means that the pulped secondary fiber is treated to disperse uniformly the non-cellulose materials (e.g., printing, ink, coatings) throughout the bulk of the cellulose mass. The end product of a repulping process is a paper having some degree of print, ink, coatings, etc., uniformly dispersed throughout. In other words, repulping does not normally produce a high purity cellulosic product.

To complete the background for the methods of the present invention, deinking processes may be broken into two broad classes viz., "flotation" and "washing". Flotation methods of deinking generally involve passing a stream of air bubbles through an aqueous pulped or defibered cellulose fiber slurry such as that which would be produced in a defibering step in a pulping process. The cellulose fiber slurry passing through a flotation apparatus or cell (e.g., an air flotation cell) which generally has been treated with flotation agents to promote the adhesion of ink particles to air bubbles passed therethrough. The air bubbles rise to the top of the aqueous fiber slurry and carry the ink particles with them generating a substantial amount of foam or froth which is then removed from the flotation cell. In "washing" methods of deinking, unwanted non-cellulosics, such as ink and coatings are more or less uniformly dispersed or emulsified throughout the aqueous cellulose fiber slurry there being no particular desire to form bubbles and subsequent foam. (In fact foam and froth generally decrease washing process efficiency.) The objective in a washing process is to force unwanted non-cellulosics such as ink to migrate from the cellulosic fiber into this aqueous medium and then to separate the aqueous medium from the fiber. The compositions of the invention are applicable to repulping, flotation deinking, and washing deinking. The unexpected applicability of the instant compositions to each of these three methods of secondary fiber treatment will now be discussed.

The first area of secondary fiber treatment in which the instant compositions have been found to be useful is that of repulping. As discussed above, repulping processes employ secondary fiber to produce lower grades of paper and paper products such as industrial toweling, linear board and corrugated media. Unexpectedly, the compositions of the present invention have been found to be "size-safe" in repulping processes.

In order to understand what is meant by "size-safe" it must be remembered that the ultimate objective of a repulping process is to produce paper having a substantially homogeneous dispersion of non-cellulosic materials therethrough. In addition, since a substantial portion of repulped paper is employed to produce paper interliners and interleaving where water resistivity is desirable, (e.g. in a paper sleeve for six cans of beer), the use of conventional nonionic surfactants in repulping has been generally avoided. Conventional surfactants tended to interfere with or inhibit the deposition of alum size subsequently added. Since it is desirable for the size or sizing deposition not to be interfered with (to enhance qualities such as ink receptivity or water resistivity) it follows that conventional surfactants have not been used in the repulping processes.

To illustrate the above, Table 3 shows some Hercules Test Values (in seconds) for a number of materials tested. The number of seconds indicates the amount of time needed for a colored aqueous test fluid to penetrate a standard repulped hand sheet made employing the listed surfactants. The greater the number of seconds needed for the water to penetrate, the better the size has been maintained on the fiber and the more water resistivity of the paper.

TABLE 3

|  | Lb/Ton | Hercules Test Seconds |
|---|---|---|
| Nonylphenol-EO$_{9.5}$ | Blank | 70 |
| " | 0.5 | 22 |
| " | 2.0 | 10 |
| Nonylphenol-EO$_{9.5}$PO$_6$ | 0.5 | 46 |
| " | 2.0 | 10 |
| R-N—EO$_{7.5}$PO$_6$ | 0.5 | 110 |
| " | 2.0 | 120 |
| R-N—EO$_{10}$PO$_{12}$ | 0.5 | 130 |
| " | 2.0 | 240 |

Thus, in one aspect, the instant invention is a repulping method for generating defibered, sized-enhanced, water resistant paper product from secondary fiber comprising the steps of agitating the secondary fiber in an aqueous, alkaline medium, comprising a composition of Formula V, said medium being maintained at a pH in the range of 9 to 12 and a temperature in the range of 80° F. (27° C.) to 200° F. (93° C.); whereby a fiber slurry is produced, mixing the slurry with a sizing precursor; acidifying the slurry to lower its pH in the range of about 4.5 to 6.0, so as to precipitate said size; forming a size enhanced paper web from the acidified slurry; drying and forming the web to produce a sized enhanced recycled paper.

In yet another aspect the invention provides a low foam method of deinking secondary fiber comprising the steps of:

A. agitating sufficient secondary fiber in aqueous alkaline pulping medium comprising a composition of Formula V to produce a fiber slurry of up to 15% fiber by weight and emulsified and dispersed non-cellulosic contaminants, the medium having a pH greater than 8 and a temperature in the range of 80° F. (27° C.) to 180° F. (82° C.);

B. concentrating the slurry to a percent by weight of fiber up to 25%; whereby an aqueous effluent and a slurry concentrate are produced;

C. optionally recycling the aqueous effluent to agitating step A after clarification by:
 1. acidifying the effluent to a pH of less than 8 thus causing emulsified materials to de-emulsify.
 2. adding a flocculating agent to said effluent whereby de-emulsified non-cellulosic materials can be separated from the effluent.
 3. adding base to the clarified effluent.

D. separating non-cellulosic contaminants in the slurry concentrate from the cellulosic fiber in the concentrate by deinking; and E. forming the cellulosic fiber into paper.

In a preferred practice of the above method, D is accomplished by:
1. acidifying the concentrate to a pH of less than about 8;
2. passing the acidified slurry through a flotation cell; and
3. optionally increasing the pH of the slurry and passing it through a washing step.

It is to be noted that the above deinking method has an optional recycling step "C". This optional step is referred to in the art as "hot-loop clarification". In the parlance of technology, the hot-loop apparatus consists of the pulping or defibering apparatus, the dump chest, a cleaner, a means to concentrate the slurry up to 25% fiber (e.g., a decker), a clarification system to add clarifying flocculants, along with a return means which attempts to recycle some of the expensive chemicals and water generated in the concentation step to the start of the pulping process. The initial pulping step occurs by means of agitation in a high shear environment provided by the pulper with or without other pulping aids. Temperatures in the range of 80° F. (27° C.) to 180° F. (82° C.) are employed along with caustic (NaOH,) other defibering or pulping chemicals (called pulping aids) as well as conventional nonionic surfactants have been employed in this pulping step. "Hot-Loop Clarification" amounts to removal of unwanted contaminants of materials in the hot loop stream so as to clarify and remove unwanted materials therefrom. Clarification of the cooking liquor (as it is called) after the concentration step is normally accomplished by adding a high molecular weight (e.g., one million or more) flocculating agent or flocculant, thus precipitating opacity-producing materials. As practiced in pulping, compositions of the present invention maintained are at a pH in the range of 9 to 12 and at a temperature of about 80° F. to about 180° F. In a preferred practice one or more other pulping aides are used to defiber the secondary fiber source. After pulping, or defibering the hot mass is treated with acid to decrease its pH to the range of 8 or less. This decrease in pH tends to cause the surfactants to loose their emulsification properties resulting in the pulping liquor being separated into an aqueous phase (along with the surfactants of the invention) and a substantially non-aqueous phase of unwanted contaminants. At this point, the unwanted contaminants maybe separated from the processing stream and discarded. Having thus clarified the hot loop by pH adjustment, this aqueous mixture then is returned to the start of the processing stream. In this manner expensive chemicals are recycled and unwanted contaminants are removed from the processing line thus "clarifying" the loop. The aqueous phase containing the surfactants of the invention then is treated with base to deprotonate the amine functionality to provide the high emulsification properties characteristic of nonionic surfactants.

As noted, the compositions of the present invention also have applications in deinking processes where the desired end result is substantially reusable white paper. Polypropoxylation (or benzylation) of single chain alkylamine polyethylene oxide polyethers provides nonionic surfactants which can be employed in both washing and flotation deinking processes. This universality of application also originates in the pH sensitivity of the instant compositions. For example, if maintained at a high basic pH range, the instant nonionic surfactants have little or no foaming tendency depending upon the extent of PO or terminal block and the temperature at which they are employed. This is important in the initial pulping step because excessive foam at this point merely serves to decrease pulping efficiency. Excess foaming or tendency to foam also leads to air entrained in the processing stream which again decreases overall efficiency of the pulping process. The propoxylated or benzylated materials of the invention provide substantial advantages over the "PR and Priminox" Series of materials commercially available from Rohm and Haas Company in that they have substantially less foaming tendency than these materials. Thus it is critically important to the increase in the efficiency of repulping that propoxylation and benzylation occur. No mention of this increase in efficiency is made in any of the literature available relating to these materials.

Subsequently, by selective downward adjustment of the pH, it has been found possible to adjust very precisely the foaming tendency or foam stability of the medium containing the compositions of the invention. In other words, the compositions of the invention by means of pH adjustment can be employed successfully in washing-type deinking processes where little foaming tendency is required and flotation-type processes where substantial foaming tendency is required. Both of these previously mutually exclusive goals are met by the expedient of pH adjustment employing surfactants of the present invention.

The instant invention will now be illustrated by reference to a series of examples which are intended to be illustrative and not limiting.

EXAMPLE I

Illustrating the use of compositions of the present invention in paper making in both washing and flotation-type deinking processes.

Secondary fiber consisting of 50% ground wood free book and 50% printed ledger was added at a 5.5% fiber consistency to a "Morden Slush Maker" pulper. Fifteen hundred gm of the fiber stock, 15 gm of 50% caustic (1% of fiber) and 4.5 cc of the specified pulper additive (0.3% of fiber) also were added to the pulper. Pulping was done at 140° F. (60° C.) for 3 minutes followed by 40 minutes at no agitation and then a 30 second final pulping "burst". The sixteen hundred ml slurry so produced in the pulper then was diluted to 15,000 ml (0.6 concentration) for processing through a flotation cell. The Voith Morden 17 liter flotation cell had a recirculating pump and an air injection system that generates foam to lift unwanted ink through the surface of the aqueous stream. In order to facilitate comparison between stocks generated in a flotation cell and those generated by washing, under surface stock samples were withdrawn from the flotation cell every four minutes for a total of 20 minutes and were converted into hand sheets. After a 20-minute period of repulping, an end-product sample was washed on a side hill screen (a washing-type deinking step) 3 times and then converted to a hand sheet. The hand sheets generated during the flotation cell process were compared to the hand sheets of the stock from the pulper (i.e., with no washing or flotation deinking) after having traversed three side hill washers. The data generated in this run is summarized in Table 4.

rial having 6 moles or propylene oxide, and 68.6 for material having no propoxylation.

One skilled in the flotation art will recognize that composition 2 in Table 4 is a conventional industry-standard flotation aid. It is critically important to note that the compositions of the invention (i.e. compositions of run 7 and 8) indicate (in the "change" last column of Table 4) that the compositions of the invention produce a brightness increase which is better than or equal to materials presently available. It is to be noted that roughly half as much material is employed in each of the runs of the invention vs. the industry standard compositions. Thus a cost advantage is obtained. Perhaps more importantly, the industry standard flotation aid containing soap is commonly employed so as to produce a soap "scum" which is referred to in the industry as a calcium soap, water insoluable collector. In operation, nonionic surfactant bubbles lift water and insoluable soap, to which is attached dislodged ink particles. Thus, the insoluable soap scum containing the ink particles may be drawn from the flotation cell. The disadvantage of this variety of flotation aid is two-fold. First,

TABLE 4

| Run | Pulper Additive | (% on fiber) | Unwashed Pulp Brightness | Brightness After 3 Washes | Change | Brightness Values After Flotation (Minutes) | | | | | Brightness After 3 Washes (flotation) | Change |
| --- | --- | --- | --- | --- | --- | --- | --- | --- | --- | --- | --- | --- |
| | | | | | | 4 | 8 | 12 | 16 | 20 | | |
| 1 | Soap | 0.3 | 59.5 | 67.3 | 7.8 | 68.3 | 69.2 | 69.7 | 70.5 | 71.2 | 75.0 | 15.5 |
| 2 | Soap + Nonylphenol-EO 9.5 | 0.3 | 62.8 | 70.5 | 7.7 | 69.3 | 72.0 | 72.8 | 73.0 | 73.1 | 77.9 | 15.1 |
| 3 | Nonylphenol-EO 9.5-PO 6 | 0.3 | 60.3 | 67.9 | 7.6 | 64.7 | 68.3 | 69.5 | 71.1 | 71.4 | 75.2 | 14.9 |
| 4 | Nonylphenol-EO 9.5-PO 24 | 0.3 | 61.7 | 67.6 | 5.9 | 59.9 | 63.8 | 62.3 | 64.5 | 63.9 | 75.0 | 13.3 |
| 5 | $R_1$—NH—(EO)$_{10}$ | 0.3 | 60.9 | 69.4 | 8.5 | | | | | | | |
| | (a) pH 6.0 | | | | | 66.6 | 68.1 | 69.8 | 69.3 | — | 74.5 | 13.6 |
| | (b) pH 4.5 | | | | | 64.0 | 65.3 | 68.3 | 68.6 | — | 73.0 | 12.1 |
| | (c) pH 8.0 | | | | | 66.1 | 66.7 | 67.5 | — | — | 74.5 | 13.6 |
| 6 | Soap + $R_1$—NH—(EO)$_{10}$ | 0.3 | 58.7 | 70.9 | 12.2 | 66.9 | 70.3 | 71.2 | 71.1 | 70.6 | 77.5 | 18.7 |
| 7 | $R_1$—NH—(EO)$_{10}$—PO$_6$ | 0.3 | 63.7 | 71.5 | 7.8 | | | | | | | |
| | (a) pH 4.5 | | | | | 67.6 | 70.1 | 71.5 | 72.9 | 71.6 | 78.2 | 14.5 |
| | (b) pH 8.0 | | | | | 70.0 | 71.0 | 71.7 | 71.5 | 70.5 | 78.1 | 14.4 |
| 8 | $R_1$—NH—(EO)$_{10}$—PO$_{12}$ | 0.3 | 63.4 | 73.1 | 9.7 | | | | | | | |
| | (a) pH 4.5 | | | | | 70.0 | 71.9 | 72.5 | 73.8 | 75.3 | 80.3 | 16.9 |
| | (b) pH 8.0 | | | | | 69.7 | 73.0 | 73.2 | 73.0 | 73.0 | 79.6 | 16.2 |

Notes to Table 4
Brightness values are as measured on a Hunter Reflectometer.
$R_1$ is a $C_{12}$-$C_{14}$ tertiary alkyl hydrophobe.

Soap in runs 1, 2 and 6 was made in situ using a commercially available tall oil fatty acid available from Union Camp as Unitrol DSR 90 neutralized with sodium hydroxide.

Runs 7 and 8 are compositions of the present invention. In both cases, brightness values obtained in this flotation run were better at the lower pH (i.e. 4.5). Furthermore, performance (as indicated by the brightness values) was better in the higher propoxylated materials. In other words, the brightness values obtained after sixteen minutes of flotation deinking were 78.8 for material having 12 moles of propylene oxide, 72.9 for materesidual soap from the flotation stage can cause deposit problems in subsequent stages of the deinking process. Second, if combinations of washing and flotation deinking processes are employed (as is common in the United States), residual soap can cause foaming problems which interfere with proper drainage in subsequent washing stages.

EXAMPLE 2

Illustrating utilization of the present compositions in flotation deinking.

Hand sheet brightness of three different compositions in flotation deinking was compared in an industrial environment. The three compositions were:
1. Nonylphenol $EO_9$-$PO_6$;
2. A low-foaming nonionic surfactant as in 1 plus butyl cellosolve plus an acrylic acid polymer polyelectrolyte; and
3. A trialkylmethylamine-$EO_{10}$-$PO_{12}$ of the invention.

The above compositions were evaluated for flotation deinking capabilities as described below.

First a furnish of printed government document grade secondary fiber (i.e., a secondary fiber source) was pulped at a temperature at 120° F. (49° C.) and pH of 11.0 for a time period 5 minutes in a kitchen blender. This fiber stock was used in all the experiments herein described. Before any sodium hydroxide or any other deinking aid was added to the fiber stock, a sample was withdrawn and a hand sheet made therefrom as a start up reference for each of three pulper batches. Next, sodium hydroxide (beaded) at 1% by weight and the respective deinking chemical was added to the fiber stock. The deinking composition tested was added at the rate of 22 ml per four pounds fiber or approximately 20 pounds deinking composition per ton of fiber. The repulped fiber stock containing the deinking composition and sodium hydroxide was allowed to circulate through a flotation cell commercially available from Bird Equipment Company for a time period of 30 minutes. A pH in the range of 10.5 or 11.5 was employed (except during a pH sensitivity test in which case it was lowered to 7.0), a temperature in the range of 65° F. (24° C.) to 75° F. (68° C.) and a fiber consistency of approximately 6% also was utilized. The foam generated by the flotation apparatus was collected and used to make hand sheets labeled "rejects". Hand sheets labeled "accepts" also were made by periodically withdrawing samples from the flotation cell. The results of this comparative evaluation are described in Table 5.

TABLE 5

| | Composition | | |
|---|---|---|---|
| | 1 | 2 | 3 |
| | | pH | |
| | 10.8 | 10.8 | 10.8 initially then acidified to 7.0 |
| Ink Particles | | | |
| Start-Up | Few distinct ink specks on a gray background | Many distinct black ink specks on a gray background | Several distinct black ink specks on a gray background |
| Accepts | Few, small specks | Few, small specs larger than for composition 1 | Few, small ink specks, less than for composition 1 |
| Rejects | Light gray background | Medium gray background. Many small distinct specs | Dark gray background. Many large distinct ink specs |
| Foam Characteristics | Very thick and stable. Extremely difficult to manage | Stable and thick. Manageable | Loose, frothy, unstable, easily manageable |
| Brightness (Hunter Lab) | | | |
| (a) Start-up | 60.08 | 57.99 | 54.75 |
| (b) Accepts | 66.62 | 64.63 | 65.70 |
| (c) Rejects | 58.97 | 48.33 | 41.56 |
| b-a | 6.54 | 6.64 | 10.95 |
| b-c | 7.65 | 16.30 | 24.26 |

Note: Handsheets were examined under magnification to evaluate ink particle size, distribution across the sheet, and general sheet quality.

Based on the information described in Table 5, it is clear that composition 3 (the composition of the invention) is the most effective deinking composition for use in the flotation deinking cell among those tested. The foam generated employing compositions of the invention are very unstable forming large fluffy bubbles which collapse quickly upon removal of a sample from the flotation cell. This is one of the advantages of the invention, namely, the unstable foam permits utilization of smaller storage and conveyance facilities for the foam drawn from the flotation cell.

Further confirmation is obtained from the Hunter laboratory evaluation of the hand sheets generated from flotation deinking fiber stock. Under composition 3 it is found that the difference between the "accepts" and "rejects" is approximately 24 Hunter laboratory brightness units. For composition 2 it is approximately 16 and for composition 1 it is approximately 7. It follows that the compositions for the present invention provide an increase in brightness of from about 300 to about 150% of conventional flotation aids. This presents a substantial advantage neither described nor suggested in any of the art dealing with this technology.

The above example was intended to illustrate the instant invention. One skilled in the art will recognize several alternatives and variations which should be included within the scope hereof.

EXAMPLE III

To illustrate the additional foam control obtainable in a practice of this invention, reference is made to tables 6, 7, and 8. Table 6 shows the effect of propoxylation on foam break temperature for a number of amine polyethers. Table 7 illustrates the effect of propoxylation on foam stability for the same compositions listed in Table 6. Table 8 illustrates the effect of temperature on foam stability for a specific t-$C_{13}$-NH-$EO_{10}$-$PO_{12}$H listed in Tables 6 and 7.

TABLE 6

EFFECT OF ETHOXYLATION/PROPOXYLATION ON FOAM BREAK TEMPERATURES
t-$C_{13}$—NH—$(C_2H_4O)_m(C_3H_6O)_nH$

| m | n | Foam Break Temp. °F. (°C.) | |
|---|---|---|---|
| 7.5 | 0 | 136° F. | (58) |
| 7.5 | 6 | 77 | (25) |
| 7.5 | 9 | 67 | (19) |
| 7.5 | 12 | 56 | (13) |
| 7.5 | 18 | 50 | (10) |
| 10.0 | 0 | 165 | (74) |
| 10.0 | 6 | 97 | (36) |
| 10.0 | 12 | 68 | (20) |
| 10.0 | 18 | 58 | (14) |
| 10.0 | 24 | 48 | (9) |
| 12.5 | 0 | 182 | (83) |
| 12.5 | 12 | 82 | (28) |
| 12.5 | 24 | 55 | (13) |
| 12.5 | 36 | 48 | (9) |

TABLE 7

EFFECT OF ETHOXYLATION/PROPOXYLATION AND pH ON DYNAMIC FOAM GENERATION $t\text{-}C_{13}\text{—NH—}(C_2H_4O)_m(C_3H_6O)_nH$

| | | pH 12.0 Foam Height in inches | | | pH 6.0 Foam Height in inches | | |
|---|---|---|---|---|---|---|---|
| m | n | 110° F.* | 80° F.** | 50° F.*** | 110° F. | 80° F. | 50° F. |
| 7.5 | 0 | 8 | 8 | 8 | all | | |
| 7.5 | 6 | 0 | 3 | 8 | | | |
| 7.5 | 9 | 0 | 0 | 8 | | | |
| 7.5 | 12 | 0 | 0 | 4 | | | |
| 7.5 | 18 | 0 | 0 | 3 | at | | |
| 10.0 | 0 | 8 | 8 | 8 | | | |
| 10.0 | 6 | 0 | 8 | 8 | | | |
| 10.0 | 12 | 0 | 0 | 6 | | | |
| 10.0 | 18 | 0 | 0 | 6 | | | |
| 10.0 | 24 | 0 | 0 | 2 | 4–6 inches | | |
| 12.5 | 0 | 8 | 8 | 8 | | | |
| 12.5 | 12 | 0 | 3 | 8 | | | |
| 12.5 | 24 | 0 | 0 | 4 | | | |
| 12.5 | 36 | 0 | 0 | 1 | | | |

*110° F. = 43° C.
**80° F. = 26° C.
***50° F. = 10° C.

TABLE 8

EFFECT OF TEMPERATURE AND pH ON DYNAMIC AND STATIC FOAM OF $t\text{-}C_{13}NH(C_2H_4O)_{10}(C_3H_6O)_{12}H$

| T, °F. Temp. | pH | Dynamic Foam Ht. | Static Foam Ht. 5' min. | Seconds to 0 Foam |
|---|---|---|---|---|
| 110° | 10 | 0 | 0 | 0 |
| 110° | 8 | 0 | 0 | 0 |
| 110° | 6 | 6 | 0 | 30 |
| 110° | 4 | 6.5 | 0 | 50 |
| 80° | 10 | 0 | 0 | 0 |
| 80° | 8 | 0 | 0 | 0 |
| 80° | 6 | 6 | 0 | 30 |
| 80° | 4 | 6.5 | 0 | 50 |
| 50° | 10 | 8 | 4 | 300 |
| 50° | 8 | 8 | 2½ | 300 |
| 50° | 6 | 5.5 | 0 | 20 |
| 50° | 4 | 6 | 0 | 40 |

To illustrate how Tables 6 and 7 may be read together to show the added foam control parameters provided by the present invention, take, for example, the first listed material in each table. This material would be a trialkylmethylamine having 13 carbon atoms in its hydrophobic portion. The secondary amine links the hydrophobic portion and an average of 7.5 moles of ethylene oxide. As listed in Table 6, the foam break temperature for the material is 136° F. (58° C.). Looking at Table 7, and measuring the foam height at 110° F. (43° C.), 80° F. (26° C.), and 50° F. (10° C.), it is found that each measurement produces a foam height of 8 inches or more. This is true because the measurement temperatures are each below the 136° F. (58° C.) foam break temperature of the composition. Focusing upon the next listed material having 7.5 moles of ethylene oxide, 6 moles of propylene oxide, with a foam break temperature of 77° F., it is found that foam height at 110° F. is zero. At 80° F., near the foam break temperature, a relatively small three inch column of foam is generated. At 50° F. (i.e. substantially below the 77° F. foam break temperature), roughly an 8 inch head of foam results. Similarly, in the $\text{-EO}_{10}H$ and $(EO)_{12.5}H$ species where the foam break temperatures are 165° F. and 182° F. respectively, the foam heights at 110°, 80° and 50° are all in excess of 8 inches.

The addition of a relatively small amount of propylene oxide to the ethylene oxide polyether brings about a substantial reduction in the foam break temperature. For example, the addition of 6 moles of propylene oxide to an alkylamine polyether having 10 moles of ethylene oxide reduces the foam break temperature to 97° F. Thus, at 110° under the pH 12.0 column, foam height is essentially zero while at 80° and 50°, the foam height is in excess of 8 inches.

Turning to the pH 6.0 column of Table 7, it is indicated that all species therein provide a foam height in the range of 4 inches to 6 inches. It is to be remembered that at this pH, the compositions of the invention will be essentially quaternized (that is, they have been protonated). Quaternization substantially reduces the effect of propoxylation with respect to the foam characteristics of the molecule. Furthermore, the foam generated for each of these materials in this pH range is unstable, fluffy and very amenable to collapse. This is illustrated in Table 8 where both the extent of foaming and its stability is explored for a single material from Tables 6 and 7.

Table 8 indicates for three different temperature ranges and four different pH ranges, foam height and foam stability. For example, at 110° F. at a pH of 8–10, zero foam is generated. This evidences the effect of propoxylation of the ethyloxated alkylamine. Furthermore, as pH is dropped from approximately 8 to approximately 6, the table indicates that the effect of propoxylation is mitigated. It should be noted that this is the "dynamic foam height". Dynamic foam height differs from "static foam height" in that the spray mechanism is shut-off in the latter. Once the spray mechanism is shut-off at pH's in the range of 6–8, the foam very rapidly collapses. Thus, reading across from the 110° F. column at a pH of 6, dynamic foam height of 6 and foam height after 5 minutes of zero would be a 6 inch column having collapsed to zero in roughly 30 seconds. Similarly, at a pH of 4, roughly 50 seconds are required after the spray mechanism is shut-off for the foam height to collapse to zero.

This is a critically important aspect of the methods of the instant invention. In essence, the ability to control dynamic and static foam as a function of pH and operating temperature, means that in the paper making process an additional parameter for foam control has been identified. Employing the compositions of the present invention paper making on the alkaline side, foam is strictly dependent upon the presence or absence of propylene oxide (or its equivalent). On the acid side, the influence of propylene oxide on foam characteristics is no longer found. It is found that the presence or absence of foam (and its stability) is strictly dependent upon pH. This means that in deinking processes employing either flotation, washing or a combination of steps, the extent and stability of foam can be controlled by adjustment of pH, temperature or both.

Thus, where large amounts of stable foam are desired, selection of an appropriately propoxylated alkylamine or operating temperature below the foam break temperature would be desirable. Where a less stable, frothy foam is desired, adjustment of pH would be in order. By this it is seen that an additional parameter controlling the extent and stability of foam has been identified.

What is claimed is:

1. A foam controllable, pH sensitive alkylamine polyether of the structure:

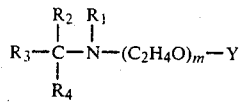

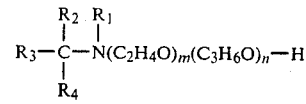

wherein
(a) $R_1$ is alkyl and $R_2$, $R_3$ and $R_4$ are alkyl or hydrogen, the total number of carbon atoms in $R_1+R_2+R_3+R_4$ falling in the range of 7 to 36;
(b) The $-(C_2H_4O)_m-$ segment must be a poly(oxyethylene) homogeneous chain or block polymer, m having an average value in the range of 5–13; and
(c) Y is a homogeneous poly(oxypropylene) chain block polymer, of the structure $-(C_3H_6O)_nH$, n having an average value in the range of 6–30.

2. The polyether according to claim 1 wherein the total number of carbon atoms in $R_1+R_2+R_3+R_4$ falls in the range of about 10 to 20.

3. A foam controllable, pH sensitive alkylamine polyether of the structure:

wherein
(a) $R_1$ is hydrogen;
(b) $R_2$, $R_3$ and $R_4$ are at least methyl groups, the total carbon atoms of $R_2+R_3+R_4$ falling the range of 7 to 23;
(c) the $-(C_2H_4O)_m-$ segment must be a poly(oxyethylene) homogeneous chain block polymer, m having an average value of 10; and
(d) the $-(C_3H_6O)_n-$ segment must be a homogeneous poly(oxypropylene) chain block polymer, n having a value in the range of 6–24.

4. The polyether according to claim 3 wherein $R_2+R_3+R_4$ have a total number of carbon atoms in the range of 12 to 22.

5. The polyether according to claim 3 wherein m is 10 and n is 6–24.

* * * * *